(12) United States Patent
Kesting et al.

(10) Patent No.: US 10,830,604 B2
(45) Date of Patent: Nov. 10, 2020

(54) METHODS AND SYSTEMS FOR DETECTING A CLOSURE OF A NAVIGABLE ELEMENT

(71) Applicants: TomTom Traffic B.V., Amsterdam (NL); TomTom Global Content B.V., Amsterdam (NL)

(72) Inventors: Arne Kesting, Berlin (DE); Nikolaus Witte, Berlin (DE); Jean-Claude Mattelaer, Gentbrugge (BE)

(73) Assignee: TOMTOM GLOBAL CONTENT, B.V., Amsterdam (NL)

( * ) Notice: Subject to any disclaimer, the term of this patent is extended or adjusted under 35 U.S.C. 154(b) by 483 days.

(21) Appl. No.: 15/110,419

(22) PCT Filed: Jan. 9, 2015

(86) PCT No.: PCT/EP2015/050348
§ 371 (c)(1),
(2) Date: Jul. 8, 2016

(87) PCT Pub. No.: WO2015/104383
PCT Pub. Date: Jul. 16, 2015

(65) Prior Publication Data
US 2016/0334241 A1   Nov. 17, 2016

(30) Foreign Application Priority Data

Jan. 10, 2014 (GB) .................................. 1400382.6

(51) Int. Cl.
*G01C 21/36* (2006.01)
*G01C 21/32* (2006.01)
(Continued)

(52) U.S. Cl.
CPC ......... *G01C 21/3691* (2013.01); *G01C 21/32* (2013.01); *G01C 21/3492* (2013.01);
(Continued)

(58) Field of Classification Search
CPC .................................................. G01C 21/3691
See application file for complete search history.

(56) References Cited

U.S. PATENT DOCUMENTS 8,606,511 B2 * 12/2013 Johnson ............. G01C 21/3415
701/414
8,731,808 B2 * 5/2014 Tashiro .................. G01C 21/32
701/118
(Continued)

FOREIGN PATENT DOCUMENTS

CN        101046920 A    10/2007
CN        102576491       7/2012
(Continued)

OTHER PUBLICATIONS

Wendy Weijermars: "Analysis of urban traffic patterns using clustering", Apr. 13, 2007 (Apr. 13, 2007), XP055178169, Retrieved from the Internet:URL:http://doc.utwente.nl/57837/1/thesisWeijermars.pdf [retrieved on Mar. 20, 2015].
(Continued)

*Primary Examiner* — Michael A Berns

(57) ABSTRACT

A method of detecting the closure of a navigable element forming part of a network of navigable elements within a geographic area. A server obtains positional data relating to the movement of a plurality of devices along the navigable element with respect to time. The positional data is used to determine an elapsed time since a device was last detected on the navigable element, and the determined elapsed time is compared to an expected time interval between consecutive devices being detected on the navigable element. The navigable element is identified as being potentially closed, subject to one or more optional validation steps, when the determined elapsed time exceeds the expected time interval, e.g. by a predetermined amount.

13 Claims, 2 Drawing Sheets

(51) Int. Cl.
*G08G 1/01* (2006.01)
*G01C 21/34* (2006.01)
(52) U.S. Cl.
CPC ......... *G08G 1/0112* (2013.01); *G08G 1/0133* (2013.01); *G08G 1/0141* (2013.01)

(56) References Cited

U.S. PATENT DOCUMENTS

| | | | | |
|---|---|---|---|---|
| 9,508,257 | B2* | 11/2016 | Tashiro | G01C 21/32 |
| 9,559,804 | B2* | 1/2017 | Ibrahim | H04L 67/18 |
| 9,696,169 | B2* | 7/2017 | Johnson | G01C 21/3461 |
| 2008/0094250 | A1* | 4/2008 | Myr | G08G 1/04 340/909 |
| 2010/0256903 | A1 | 10/2010 | Johnson | |
| 2011/0231087 | A1 | 9/2011 | Johnson et al. | |
| 2012/0143492 | A1 | 6/2012 | Johnson | |
| 2013/0162449 | A1* | 6/2013 | Ginsberg | G08G 1/095 340/910 |
| 2014/0067938 | A1* | 3/2014 | Boldyrev | G01S 5/0252 709/204 |

FOREIGN PATENT DOCUMENTS

| | | |
|---|---|---|
| CN | 102968901 A | 3/2013 |
| EP | 2650649 A1 | 10/2013 |
| GB | 2428852 A | 2/2007 |
| JP | 2003207342 A | 7/2003 |
| JP | 2006195657 A | 7/2006 |
| JP | 2006250735 A | 9/2006 |
| JP | 2009282832 A | 12/2009 |
| NO | 2009157651 A2 | 12/2009 |
| WO | 2010105712 A1 | 9/2010 |

OTHER PUBLICATIONS

ISR Application No. PCT/EP2015/050348 dated Apr. 2, 2015.
Search Report of United Kingdom Application No. GB1400382.6 dated Jun. 13, 2014.
Search Report of United Kingdom Application No. GB1515487.5 dated Sep. 23, 2015.

* cited by examiner

METHODS AND SYSTEMS FOR DETECTING A CLOSURE OF A NAVIGABLE ELEMENT

CROSS-REFERENCE TO RELATED APPLICATIONS

The present application is a National Stage of International Application No. PCT/EP2015/050348, filed on Jan. 9, 2015, and designating the United States, which claims benefit to United Kingdom Patent Application 1400382.6 filed on Jan. 10, 2014. The entire content of these applications is incorporated herein by reference.

FIELD OF THE INVENTION

The present invention relates to methods and systems for detecting the closure of a navigable element, e.g. road element, in a navigable network of navigable elements.

BACKGROUND TO THE INVENTION

Obtaining information about closures of navigable elements, e.g. roads of a road network, is important in a navigation system. The presence of a road closure has a significant impact upon routing through the road network. A road closure may be likened to a traffic jam associated with an "infinite delay", such that an alternative routing must be determined to avoid the affected road element(s). Knowledge of the existence of a road closure is of importance to road users even if they are not following a pre-calculated route. For example, if a user is following a familiar route, it is still useful for them to be aware if a road closure is present affecting the route so that they may determine an alternative route, with or without the assistance of a navigation system.

Road closure information may be provided to a user, e.g. together with other travel and traffic information, during navigation along a route via an in-vehicle navigation device, such as a portable device (PND) or integrated device, or may be provided as an input to an Advanced Driver Assistance System (ADAS) device. Road closure information may also be used for route planning, e.g. by a navigation or ADAS device, before commencing a journey, or to recalculate a fastest route during a journey if conditions change during traversal along the route.

A road closure is typically a dynamic event, temporarily affecting a road, and it is therefore desirable to be able to obtain information relating to road closures in the context of a "live" system, i.e. indicative of the relatively current condition of the road network.

Conventional systems for obtaining information about road closures typically rely upon data obtained from third parties. For example, such data may be included in "Traffic Message Channel" (TMC) messages that may be broadcast over an FM network, or other similar third party messages. Such information may be based upon data obtained from sources such as police reports, or road agencies/administrators. However, there are some drawbacks in relying upon third party data relating to road closures, since such data is not always accurate, and may not be up to date.

The Applicant has realised that there remains scope for improvement in methods and systems for obtaining information relating to the closure of a navigable element, e.g. for provision to users and/or navigation or ADAS devices.

SUMMARY OF THE INVENTION

In accordance with a first aspect of the invention there is provided a method of detecting the closure of a navigable element forming part of a network of navigable elements within a geographic area, the method comprising:

obtaining positional data relating to the movement of a plurality of devices along a navigable element with respect to time;

using the positional data to determine an elapsed time since a device was last detected on the navigable element;

comparing the determined elapsed time to an expected time interval between consecutive devices being detected on the navigable element; and identifying the navigable element as being potentially closed when the determined elapsed time exceeds the expected time interval.

Thus, in accordance with the invention, positional data relating to the movement of devices with respect to time ("probe data") is obtained in respect of each of a set of one or more navigable elements that are being tested to determine whether they are potentially closed. The positional data is used to determine a time that has elapsed since a device was last found in the navigable element for each navigable element. If the elapsed time exceeds an expected time interval between consecutive devices being detected in the navigable element, the navigable element is identified as being potentially closed.

Certain prior art techniques have attempted to identify closed navigable elements by reference to an absence of probe data indicative of movements of devices along the elements. However, such methods have tended to give rise to a large number of false positives. By introducing a step whereby an elapsed time since the previous probe device passed along the element is compared to an expected time interval between devices passing along the element, it is possible to determine with greater confidence when an elapsed time since a device passed along an element is sufficiently great to allow a conclusion of potential closure to be made. The comparison step enables those elements to be identified where the difference between the elapsed time since a last visit by a device and the expected interval between visits is sufficiently great to be indicative of a potential closure of the element.

The present invention extends to a system for carrying out a method in accordance with any of the embodiments of the invention described herein.

In accordance with a second aspect of the invention there is provided a system for detecting the closure of a navigable element forming part of a network of navigable elements within a geographic area, the system comprising:

means for obtaining positional data relating to the movement of a plurality of devices along a navigable element with respect to time;

means for using the positional data to determine an elapsed time since a device was last detected on the navigable element;

means for comparing the determined elapsed time to an expected time interval between consecutive devices being detected on the navigable element; and means for, when the determined elapsed time exceeds the expected time interval, identifying the navigable element as being potentially closed.

It will be appreciated that any feature described by reference to the first aspect of the invention may equally be applied to embodiments in accordance with the second aspect of the invention and vice versa.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a determined potential closure, and/or the positional data used to determine the existence of a closure.

The methods of the present invention are, in preferred embodiments, implemented by a server. Thus, in embodiments, the system of the present invention comprises a server comprising the means for carrying out the various steps described, and the method steps described herein are carried out by a server.

The present invention considers positional data relating to the movement of a plurality of devices with respect to time along a navigable element to determine whether the element may be potentially closed. The steps of the methods in accordance with the invention in any of its embodiments are carried out in relation to each one of a set of one or more navigable element of the network, and are preferably carried out in relation to a set of a plurality of navigable elements. The navigable elements may be at least some of the navigable elements of the navigable network. The navigable elements may be any navigable elements in respect of which appropriate positional data is available to enable the method to be performed.

It will be appreciated that the network of navigable elements, and any navigable element, as referred to herein, are navigable elements of the real world or physical navigable network. The network may be represented electronically by digital map data. The digital map data may be stored by or otherwise accessible by the server, in embodiments in which the method is implemented using a server. In the digital map data, the navigable network is represented by a plurality of navigable segments connected by nodes, wherein a navigable element of the network may be represented by one or more navigable segments.

The present invention may be implemented in relation to navigable elements of any type. Preferably the navigable elements are road elements (of a road network). In some embodiments the navigable element(s) are elements of a highway, but it will be appreciated that the techniques are applicable to any type of road element, or indeed other type of navigable element, where appropriate positional data exists or can be determined. While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. The present invention is therefore applicable to detecting a closure of any navigable element.

The positional data used in accordance with the invention is positional data relating to the movement of a plurality of devices along the or each navigable element with respect to time. The method may comprise obtaining positional data relating to the movement of a plurality of devices with respect to time in the network of navigable elements, and filtering the positional data to obtain positional data relating to the movement of a plurality of devices along the or each given navigable element to be assessed for potential closure with respect to time. The step of obtaining the positional data relating to the movement of devices along the or each navigable element may be carried out by reference to the digital map data indicative of the or each navigable element representing the navigable elements of the network. The method may involve the step of matching positional data relating to the movement of devices in a geographic region including the network of navigable elements to at least the or each navigable element that is being considered in accordance with the invention.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The present invention may provide "live", i.e. short term, detection of closures based on current or near current data. For live positional data, it will be appreciated that the data may be stored shortly before being used, so that it may still be considered to be live data.

The method of the present invention preferably involves obtaining and using "live" positional data relating to the movement of a plurality of devices with respect to time along the or each navigable element that is assessed for closure in determining a potential closure of the navigable element. Live data may be thought of as data which is relatively current and provides an indication of relatively current conditions on each alternative navigable element. The live data may typically relate to the conditions on the elements within the last 30 minutes, 15 minutes, 10 minutes or 5 minutes. By using live positional data in determining the closure information, it may be assumed that the information determined is currently applicable, and may be applicable in the future, at least in the shorter term. The use of live positional data allows accurate and up to date closure information to be determined, that can be relied upon by road users and/or navigation devices or ADAS. Preferably the positional data that is used to determine the elapsed time since a device was last detected in the navigable element is or comprises live positional data.

In accordance with the invention the method comprises analysing the positional data to determine data indicative of an elapsed time since a device was last detected on the navigable element. The device is a probe device, i.e. a device in relation to which positional data relating to the movement of the device with respect to time along the navigable element is available. The device may be of any of the types described above, and is preferably associated with a vehicle. The device may be a navigation device, which may be an integrated device or a PND. The device may be any device which is capable of providing data indicative of the position of the device with respect to time. Likewise, the expected time interval that is used in embodiments of the invention (as discussed in more detail below) is an expected time interval between such probe devices being found on a navigable element.

The step of analysing the positional data to determine the data indicative of the elapsed time may be carried out in any suitable manner. The elapsed time is a time since a device was last detected in the navigable element. It will be appreciated that, e.g. a processor, may be arranged to automatically detect the presence of a probe device in a navigable element or elements of the network, and to monitor an elapsed time until a next device is detected in the element. This might be done by determining when a device is determined to traverse the one or more navigable segments of the digital map representative of the navigable element navigable, e.g. by determining when a device enters, exits or passes another reference point along the segment. As will be appreciated the determined elapsed time will be reset, i.e. begin counting again from zero, when another probe device is detected traversing the one or more navigable segments. The elapsed time may be monitored continually, or may be determined intermittently (at regular or irregular time periods). The steps of determining the elapsed time and comparing the elapsed time to an expected time interval between devices may be discrete steps. For example, the elapsed time may be monitored and an alert generated when this exceeds a threshold that s set by reference to the expected time interval for the element.

The determined elapsed time is compared to an expected time interval between devices detected on the navigable element. It is this step which may help to reduce the number of detected false positives. The expected time interval may be based upon actual detected time intervals between devices on the element, or may be derived using theoretical techniques, or combinations thereof. Thus, the interval is a statistical expectation of the period of time between which consecutive probe devices are expected to be detected traversing the navigable element; and may or may not be based upon intervals between actually detected devices. In preferred embodiments the expected time interval is based upon historical positional data relating to the movement of devices, e.g. associated with vehicles, along the element with respect to time. In this case, it is envisaged that the historical data would be relatively recent, e.g. relating to the last day or two, so that it will still adequately represent the expected interval between probe devices travelling along the element. However, the expected time interval may be derived in other manners. It will be appreciated that as the present invention is based upon the use of probe data, the expected time interval will typically be greater than an expected time interval between actual vehicles, as not every vehicle passing along the element will be associated with a device that provides data indicative of its position with respect to time to enable that enables the vehicle to be used as a probe vehicle. The expected time interval is preferably an average time interval; for example based upon a plurality of (detected) time intervals between consecutive pairs of devices passing along the element according to historical positional data.

The method may comprise storing data indicative of at least one expected time interval between consecutive vehicles detected on the navigable element, e.g. in association with digital map data indicative of the navigable element. The method may extend to determining the or each expected time interval. As will be appreciated, the expected time interval is therefore predetermined, and the method preferably comprises retrieving the predetermined value from a data storage means, e.g. memory.

In accordance with the invention, the applicable expected time interval is compared with the determined elapsed time. The expected time interval for a navigable element may be time dependent. Thus, a plurality of expected time intervals between devices passing along an element may be determined in respect of different time periods. The or each expected time interval may be an average time interval. The average time interval is then based upon time intervals between multiple different sets of consecutive detected devices in respect of a given time period. In some embodiments, multiple expected time intervals are associated with at least some of the elements. In this way when a comparison between the expected time interval and the elapsed time is performed, the applicable expected time interval for the appropriate time may be used. It may be for example that expected time intervals are calculated according to the time of the year, the day of the week and/or the time of day. As will be appreciated the expected time interval is likely to vary depending on the time of day, the day of the week and even the time of year. During peak times, the expected visit interval will be much lower than during off peak times, e.g. the night, weekends, or bank holidays. Consequently the provision of multiple expected time intervals is likely to give more accurate assessment as to the significance of the elapsed time since the last device passed along the element than a single expected time interval for an element.

In some embodiments one or more alternative expected time intervals are provided for use with an element within corresponding time periods allowing selection of the most appropriate interval at any given time based on one or more factors other than time dependent variation. Selection of an alternative interval for use may be appropriate in particular situations, for example in different weather conditions, or where a particular event such as a football game is occurring. Such situations may be considered factors other than time dependent variation. Such situations may be considered atypical.

In some embodiments alternative sets of time dependent expected time intervals are provided allowing selection of the most appropriate expected time interval based both on the time and on other factors. It may be for example that one set of time dependent expected time intervals is used if the weather is dry and another set if there is rain.

In any embodiment in which more than one expected time interval is available for a particular navigable element, the applicable time interval is used in the comparison step of the present invention, i.e. the time interval that is applicable to the current time and/or conditions.

In some embodiments, an expected time interval for a particular navigable element is scaled, e.g. based on the current time and/or conditions. For example, in an embodiment, the number of concurrent probe devices from which "live" data is currently being received can be used to scale the expected time interval. As will be understood, the number of concurrent probe devices will typically be higher during peak hours, and thus the expected time interval is preferably reduced during these hours and increased during off-peak hours, e.g. during the night, week-ends and/or bank holidays. Accordingly, there is an inverse relationship between the value of the expected time interval to be used in the method and the number of concurrent probe devices from which positional data is being received.

The method comprises comparing the determined elapsed time and the applicable expected time interval between devices for the or each navigable element, and, when the elapsed time exceeds (or exceeds by more than predetermined amount) the expected interval, identifying the navigable element as being potentially closed. This step may be carried out in any suitable manner, and is used to identify those elements for which the elapsed time exceeds the applicable expected time interval by a statistically significant amount. The amount by which the elapsed time must exceed the applicable expected time interval to be deemed appreciable may be set as desired, e.g. to reduce numbers of false positives.

The methods of the present invention are computer implemented, and may provide the ability to automatically detect potentially closed elements. The method may comprise automatically determining when an elapsed time exceeds the expected interval on a particular element by an appreciable amount, and automatically identifying that the navigable element is potentially closed. When a navigable element is identified as potentially closed, the method may comprise the step of automatically generating a message indicative of the potentially closed state of the element. The message may trigger further validation steps to be performed (e.g. as discussed in more detail below). It is envisaged that the methods of the invention may be implemented continually by a server or servers, as live positional data relating to the movement of devices in the navigable network is received.

By potentially closed, as used herein, it is meant that the navigable element is deemed to be potentially closed at least temporarily. The road closure may be a road closure as a result of roadworks.

The or each navigable element that is identified as being potentially closed is a candidate closed element. Preferably a plurality of candidate navigable elements are identified.

While it may be assumed with no further validation that a determined candidate closed element is indeed closed, preferably some additional validation is carried out to help further reduce false positives. The validation may take into account any factor or factors which would have an impact upon whether a detected interval between devices passing along the navigable element can be reliably considered to be indicative of the closure of the element. For example, where the quality of the digital map data representing the element is poor, a relatively long elapsed time since a device last passed along the element might be detected. However, this may simply be as a result of positional data relating to the movement of devices along the element not being properly matched to the element as a result of inaccuracy in the digital map data representing the position of the element in comparison to its real world position. In other words, a device which did pass along the navigable element during the elapsed time might not be detected, as it may be matched to a position that does not lie on the navigable element. Thus, an error in a digital map representing the navigable element is preferably taken into account. This may be by reference to a map matching error associated with the positional data indicative of the presence of a device on an element.

In accordance with the invention in any of its aspects or embodiments, the method preferably comprises attempting to match the positional data received from each of the plurality of devices to a position on a segment of one of a plurality of navigable segments of a digital map representing the network of navigable elements. This process may be referred to as "map matching", and may involve the use of various algorithms as known in the art. The method may comprise attempting to match each item of positional data to a position along one of the navigable segments of the digital map. As will be appreciated this process is used to associate received positional data with particular navigable segments of the digital map. In carrying out this map matching process, a map matching error indicative of a difference between a position indicated by the positional data, and the position on the navigable segment to which it is matched, may be derived in respect of each item of positional data. In embodiments, for each of the plurality of devices, the method may comprise attempting to match each positional data point to a position on a navigable segment of the digital map. A map matching error may be determined for each data point. Such a map matching error may arise for various reasons, such as, for example, general noise in the positional data signals and/or mapping errors, e.g. where a reference line of a navigable element is not correctly geo-referenced in the map such that the position of the navigable element represented by a segment of the electronic map does not precisely correspond to the actual position of the element in reality. The map matching error associated with each data point may be used in validating a candidate navigable element.

Similarly, a lack of reliability of the positional data may result in inaccurately long elapsed times being determined, e.g. where some positional data relating to devices passing along the element is missing, or attributed to other elements, etc. Likewise, where a lower than expected probe device density exists at the relevant time, i.e. where fewer than expected vehicles passing along an element are associated with a device for providing positional data for use in the methods of the invention, the expected interval may be inappropriately low, such that the difference between the elapsed time and expected interval may be deemed to be appreciably different, leading to an element being incorrectly identified as potentially closed. Alternatively or additionally, validation of a navigable element being potentially closed may be carried out using other sources of data which may corroborate the presence of a closure or otherwise. For example, traffic messages provided by a third party may indicate that the element is closed.

The validation may therefore take into account one or more of; a quality of the digital map data representing the navigable element, third party data relating to the closure of navigable elements of the network, the accuracy of the positional data used, and any combination thereof.

Preferably the method comprises validating each of the identified candidate navigable elements to identify a subset of the candidate elements that can be validated as being closed.

In accordance with the invention in any of its aspects or embodiments involving the determination of a closure of a navigable element, once a determination has been made that a closure exists affecting navigable element, and, in preferred embodiments, validated, the information may be used in various manners. In some embodiments the method comprises associating data indicative of the existence of the (preferably validated) closure with data indicative of the or each navigable element, e.g. in association with the one or more navigable segments of the digital map that represent the navigable element. The method therefore may comprise storing data indicative of the existence of the (preferably validated) closure, preferably in association with data indicative of the or each navigable element. The method may comprise using the determined data indicative of a closure in calculating a route and/or in providing traffic information, e.g. to devices associated with vehicles. The method may comprise providing information indicative of the determined (preferably validated) closure to a third party provider, e.g. a traffic information provider.

It will be appreciated that a navigable element that is determined to be closed may be represented by a portion of a navigable segment, or by portions of multiple navigable segments of the digital map. Therefore, in embodiments, the method comprises determining the start and end locations of the determined road closure with reference to locations along navigable segments of the digital map. This determined navigable stretch, which may comprise a portion or portions of one or more navigable segments, can be provided to devices and/or third parties in any suitable form, e.g. by being encoded using any suitable locations referencing techniques, such as OpenLR or AGORA-C.

As will be appreciated a navigable element as referred to herein is an element for a given direction of travel. The determined closure is therefore a closure affecting at least one direction of travel.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

If not explicitly stated herein, the term "elapsed time refers herein to the elapsed time since a device was last detected on the navigable element according to the positional data, unless the context demands otherwise. The term expected time interval refers to the (applicable) expected time interval between consecutive devices detected on the navigable element. The devices are probe devices. References to the elapsed time or expected time interval may be replaced by reference to data indicative of" the relevant parameter if not explicitly stated.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining the closure of a road element of a network of road elements. Accurate determination of the existence of road closures is important in a navigation system, or simply as additional travel information to drivers. A road closure will have an impact on possible routes between an origin and a destination, necessitating alternative routes around the closed element to be used. In practice, the existence of a road closure has an effect on the road network comparable to a traffic jam of infinite severity. Whether or not a route is pre-calculated, it is important to users of a navigation system to be informed of road closures so that they can take a different route if needed. The present invention provides a method for more reliably, and automatically, detecting closures.

Figure 1:
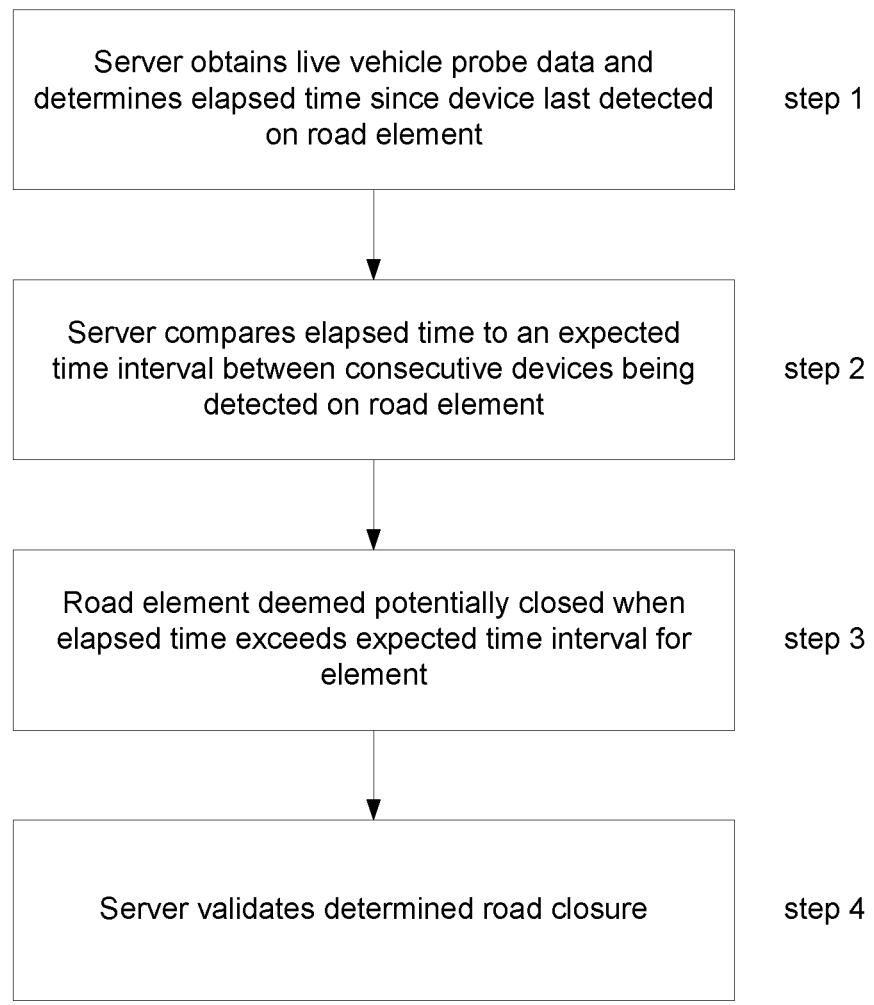
FIG. 1 is a flow chart illustrating the steps of a method for detecting the closure of a road element in accordance with an embodiment of the invention.

A preferred embodiment of the invention will be described by reference to the flow chart of FIG. 1. The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data. The probe data can be used to derive probe traces relating to travel of probe vehicles along specific road elements in a road network. The positional data may be matched to road segments of a digital map representing the network of road elements.

The steps of the method will be described by reference to determining whether a given road element is closed. The steps described below would be carried out for each road element that is tested.

The road element is associated with data indicative of one or more expected time intervals; the time interval being the expected time interval between consecutive devices being detected on the road element. A plurality of expected time intervals may be stored, each in respect of a given time period and/or given weather conditions. For example, expected time intervals may be provided for off peak and peak times each day, or for corresponding time periods e.g. 10 minute intervals on specific days of the week etc. The number of expected time intervals derived may be chosen as desired to provide a balance between accounting for significant fluctuations in traffic frequency along the road element during the day and/or week, and avoiding the need to carry out excessive amounts of processing or data storage. In other embodiments, differences in traffic density during the day may be taken into account by scaling an expected time interval value based on the number of concurrent probe devices in the relevant geographic area from which positional data is being received. Accordingly, the expected time interval would be reduced in peak hours, while it is increased during off-peak hours, such as at night, weekends and bank holidays.

The expected time interval data may be based upon historical positional data relating to the movement of devices associated with vehicles along the road element in the relevant time period to which it applies, i.e. historical vehicle probe data. The time intervals between consecutive probe vehicles being detected on the road element according to the historical probe data may be determined for a number of pairs of consecutive probe vehicles in the time period of interest. This may be done by matching the positional probe data to road segments of a digital map representing the real world road elements. An average time interval may then be derived, and used as the expected time interval for that time period. In using historical vehicle probe data to derive the expected time intervals for the road element, relatively recent historical data should be used, to ensure that the determined expected time intervals provide a reasonable reflection of the time intervals that might be expected at the current time. Thus, at peak times, considerably smaller time intervals would be expected than during the night, weekends or holiday periods. It is envisaged that a road segment of a digital map representing the road element may be associated with data indicative of each expected time interval. It will be appreciated that the expected time interval relates to the expected time interval between the appearance of consecutive probe vehicles on the road element, rather than any vehicle. Only a minority of vehicles passing along the road element would normally be expected to be probe vehicles, i.e. having devices associated therewith that are able to transmit their position with timing information, and used in accordance with the invention. Thus the expected time interval would typically be significantly greater than the time interval between any consecutive vehicles passing along the road element. An expected time interval between probe vehicles may be obtained by determining an expected time interval between any vehicles found on the element, and then scaling this value to account for the proportion of vehicles passing along the element that can be expected to be probe vehicles.

In accordance with step 1 of the method, a server obtains live positional data relating to the movement of devices with respect to time along the road element of interest. The server may receive live probe data directly from devices in the road network, or may obtain such data, e.g. from another server that is in communication with the devices. The server is arranged to monitor a time which has elapsed since the last probe device was found to be present on the road element. For example, an elapsed time may be measured from the appearance of a particular probe vehicle on the road element. The elapsed time may be reset once the next probe vehicle is found to be on the road element. This process may be carried out by matching live positional data to road segments of a digital map representing the road network, and considering the elapsed time between the appearance of successive probe vehicles on the road segment.

As described above, the road element is associated with one or more expected time intervals, being the expected time intervals between consecutive devices being detected on the road element. These may be associated with one or more road segments of a digital map representing the road element. In step 2, the server compares the applicable expected time interval and the determined elapsed time for the road element. The applicable expected time interval is the time interval that is relevant to the current time and conditions, e.g. for the relevant timeslot on the particular day of the week.

The server determines whether the elapsed time for a road element exceeds the applicable expected time interval for that element, or exceeds the applicable expected time interval by a predetermined amount. The amount by which the elapsed time must exceed the applicable expected time interval may be set as desired, and should be chosen so as to reduce the likelihood of a false positive determination of closure, but while resulting in reasonably rapid identification of potentially closed elements. In general the amount should be such that that the elapsed time must exceed the applicable expected time interval by a statistically significant amount.

Where the server determines that the elapsed time for the road element exceeds the applicable expected time interval for the element, the element is deemed to be potentially closed, and provides a candidate potentially closed element—step 3. If the elapsed time does not appreciably exceed the applicable expected time interval for the element, the element is assumed to still be open.

The server carries out steps 1, 2 and 3 in relation to a plurality of road elements of the road network. For example, this process may be carried out in relation to all road elements for which appropriate live probe data is available, with the server monitoring the elapsed time since last detection of a probe device on the element for each element. It is envisaged that the server may be arranged to automatically detect when the elapsed time for a particular element in the road network exceeds a threshold based on the applicable expected time interval. The element may then be identified as a candidate closed element. This process may be carried out by a server by applying appropriate filters to the live probe data relating to the road network. When a candidate potentially closed element is identified, the server generates a message identifying the element as a closure candidate.

Before assuming that a candidate road element is closed for any purpose which requires closure data, the candidate road elements are subjected to an additional validation process to provide a subset of elements that can be considered to be closed with a greater degree of confidence, i.e. validated closed elements—step 4. There are various factors that may mean a road element that is detected as being a candidate closed element is not in fact closed. Such factors would be those factors which may result in an incorrectly long elapsed time since the last device was detected in the road element being determined. One factor that may have this effect would be a map matching error. In determining the elapsed time since the last device was found on a road element, the server carries out map matching of the vehicle probe data to the road segments of a digital map. As known in the art, this involves attempting to match each received position from a device to a position along a road segment of the map. Where a received position does not correspond to a position along such a segment, it may be possible to match the position to the segment, where the position differed from the position of the segment by less than a threshold deemed allowable for the position to be matched to the segment, with an appropriate map matching error indicative of the difference between the observed position according to the data, and the position on the map to which it has been matched. In some cases, however, it is not possible to match a received position to a position along a road segment of the digital map, at least within an allowable map matching error for the system. This may be the case where the course of the real life road element differs substantially from that of the road segment of the digital map intended to represent it, e.g. due to a change in course of the road element that is not reflected in the map data or simply an error in the map data.

When a significant map matching error exists in relation to a position of a probe device, it is possible that the positional data relating to a probe device that did travel along a road element in the real world will not be matched to the road segment representing the road element. In other words, visits to the road element by some devices may not be detected. This may result in a falsely high elapsed time since last detection of a probe device in a road element being made, potentially causing an element to be wrongly identified as closed.

Another factor that may result in a road element being incorrectly identified as closed would be the accuracy of the probe data itself.

Thus, the validation process preferably takes into account one or both of the quality of the digital map data used in matching the probe data to road segments in the road network, and the accuracy of the probe data. Alternatively or additionally, the validation process may involve using other sources of data to verify that an element is closed or otherwise. For example, third party data identifying road closures in the network may be used. If a road element is reported closed according to such data, this may increase confidence that the element is indeed closed. Other sources of data might be data that provides an indication of whether an element has recently been traversed other than by consideration of vehicle probe data, e.g. using fixed traffic sensors, etc.

The result of the validation process will be a more limited subset of road elements that can be assumed to be closed.

Data indicative of the road elements whose closure has been validated may be used as desired. For example, the data may be transmitted to another server, or directly to navigation devices or ADAS systems associated with vehicles for use e.g. in route planning. The data may be provided as part as a traffic update transmission. Thus, the server may store the data, generate a message indicative thereof, and/or disseminate the data for use by navigation devices or ADAS systems associated with vehicles, or to another server, etc.

Figure 2:
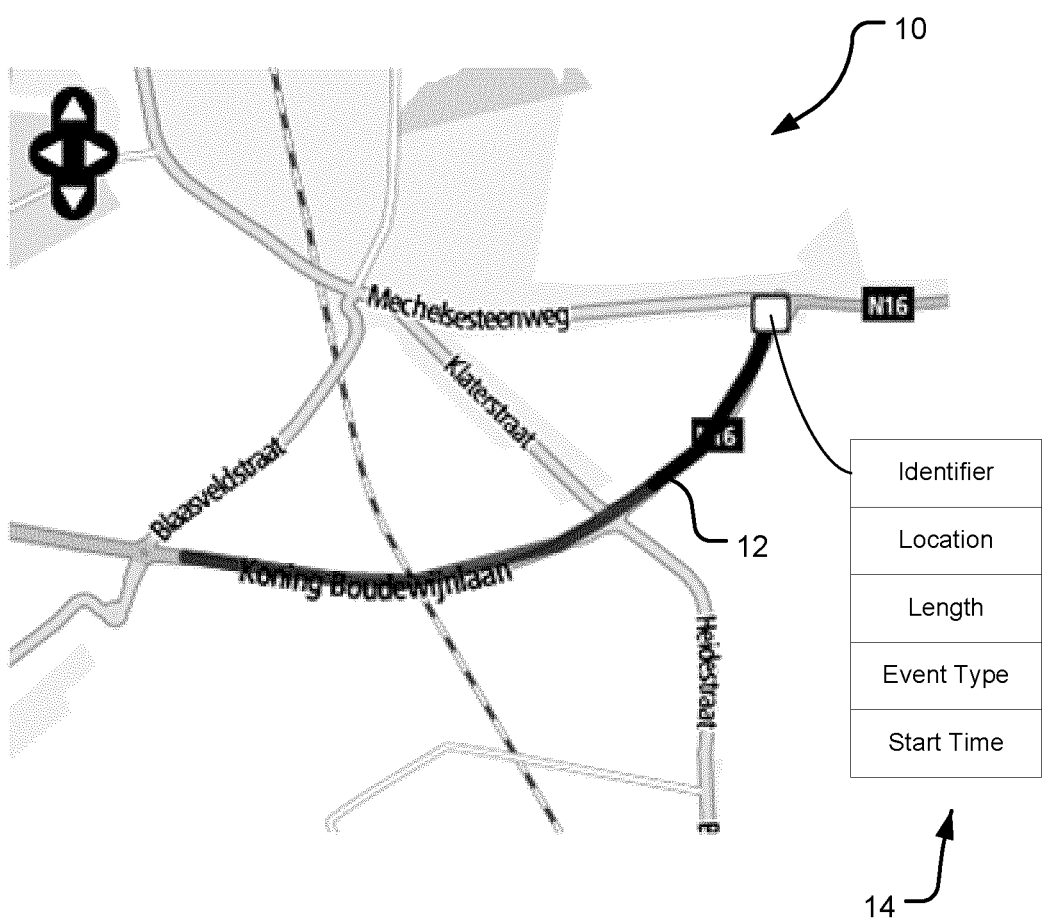
FIG. 2 shows a visual representation of a digital map with an indication of a determined road closure.

FIG. 2 shows a visualisation 10 of the road network geographic area, created using data from a digital map representative of the road network. Following the completion of the method depicted in FIG. 1 a road stretch 12 has been identified as being closed. A message 14 associated with the determined road closure contains information such as: an internal identifier; a location (e.g. with respect to the digital map); a length of the road stretch determined to be closed; an event type identifier (in this case identifying that the stretch of road is closed); and a start time (indicating when the stretch was first determined to be closed).

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of detecting the closure of a navigable element forming part of a network of navigable elements within a geographic area, the method comprising:
    obtaining positional data relating to the movement of a plurality of devices along the navigable element with respect to time;
    using the positional data to determine an elapsed time since a device was last detected on the navigable element;
    determining, for the navigable element, an expected time interval between consecutive devices being detected on the navigable element, the expected time interval being an amount of time during which consecutive devices are expected to be detected traversing the navigable element;
    comparing the determined elapsed time to the expected time interval between consecutive devices being detected on the navigable element; and
    identifying the navigable element as being potentially closed when the determined elapsed time exceeds the expected time interval.

2. The method of claim 1, wherein the obtained positional data comprises live positional data, the method comprising:
    using the live positional data to determine the elapsed time since a device was last detected in the navigable element.

3. The method of claim 1, wherein the devices are devices associated with vehicles.

4. The method of claim 1, wherein the expected time interval is based upon historical positional data relating to the movement of devices along the element with respect to time.

5. The method of claim 1, wherein the expected time interval is time dependent.

6. The method of claim 1, wherein the expected time interval is an average time interval based upon time intervals between multiple different sets of consecutive devices detected in the navigable element in a given time period.

7. The method of claim 1, wherein the expected time interval is scaled in dependence on the number of devices traversing the network of navigable elements at a given time from which positional data is obtained.

8. The method of claim 1, wherein the navigable element identified as being potentially closed provides a candidate closed navigable element, the method further comprising:
   validating candidate closed navigable elements to identify a subset of the candidate elements that can be validated as being closed.

9. The method of claim 8, wherein the validation takes into account one or more of: a quality of the digital map data representing the navigable element; a quality of the positional data; and third party data relating to the closure of navigable elements in the network.

10. The method of claim 1, further comprising associating data indicative of a determined, and optionally validated, closure with data indicative of the navigable element.

11. A non-transitory computer readable medium comprising computer readable instructions which, when executed by at least one processor of a system, cause the system to perform a method for detecting the closure of a navigable element forming part of a network of navigable elements within a geographic area, the method comprising:
   obtaining positional data relating to the movement of a plurality of devices along the navigable element with respect to time;
   using the positional data to determine an elapsed time since a device was last detected on the navigable element;
   determining, for the navigable element, an expected time interval between consecutive devices being detected on the navigable element, the expected time interval being an amount of time during which consecutive devices are expected to be detected traversing the navigable element;
   comparing the determined elapsed time to the expected time interval between consecutive devices being detected on the navigable element; and
   identifying the navigable element as being potentially closed when the determined elapsed time exceeds the expected time interval.

12. The method of claim 1, wherein the navigable element is identified as being potentially closed when the determined elapsed time exceeds the expected time interval by a predetermined amount.

13. A system for detecting the closure of a navigable element forming part of a network of navigable elements within a geographic area, the system comprising at least one processor arranged to:
   obtain positional data relating to the movement of a plurality of devices along the navigable element with respect to time;
   use the positional data to determine an elapsed time since a device was last detected on the navigable element;
   determine, for the navigable element, an expected time interval between consecutive devices being detected on the navigable element, the expected time interval being an amount of time during which consecutive devices are expected to be detected traversing the navigable element;
   compare the determined elapsed time to the expected time interval between consecutive devices being detected on the navigable element; and
   identify the navigable element as being potentially closed when the determined elapsed time exceeds the expected time interval.

\* \* \* \* \*